June 14, 1960 M. R. CANNON 2,941,144

CONDUCTIVE PARTICLE DETECTOR

Filed Dec. 30, 1957 2 Sheets-Sheet 1

INVENTOR

Maxwell R. Cannon

BY Sughrue & Rothwell

ATTORNEYS

June 14, 1960 M. R. CANNON 2,941,144

CONDUCTIVE PARTICLE DETECTOR

Filed Dec. 30, 1957 2 Sheets-Sheet 2

INVENTOR
Maxwell R. Cannon

BY Sughrue & Rothwell
ATTORNEYS

United States Patent Office 2,941,144

Patented June 14, 1960

2,941,144

CONDUCTIVE PARTICLE DETECTOR

Maxwell R. Cannon, Endicott, N.Y., assignor to International Business Machines Corporation, New York, N.Y., a corporation of New York Filed Dec. 30, 1957, Ser. No. 705,910

1 Claim. (Cl. 324—54)

This invention relates to a device for detecting the presence of electrically conducting particles in a web of insulating material and more particularly to the detecting of such particles in a web of insulating material used for the production of record cards to control tabulating, statistical and similar machines.

Presently in use for detecting such particles in web materials are devices including a number of reading brushes contacting one surface of the web with the other surface thereof engaging another electrode. A voltage is established between the brushes and the electrode. An electrically conductive particle which contacts the brush on one side of the web and the electrode on the other will produce a signal which is processed by an electrical circuit to give a signal indication of the presence of this conductive particle. This signal might be utilized to actuate rejection means for the section of the web containing the particle or to place a mark on the web identifying the presence and position of the conducting particle.

There are three main disadvantages in systems of the above-identified type. First, the brushes scan or read only discrete tracks on the web and particles occurring between these tracks are not detected. Secondly, if the particle is completely imbedded in the web or imbedded to the extent of contacting only the brush or the electrode but not both, such a particle will go undetected. In this latter instance, repeated processing of the record cards by the utilizing machine scrubs the surfaces of the card and these undetected particles ultimately do span or substantially span the thickness of the card. Thirdly, the brushes and electrode ride opposite surfaces of the web and, due to the fact that the web is not smooth, one or the other of the brushes or electrode may contact the web only at high points thereon. Consequently, if a particle occurs while only the brush or the electrode is contacting the surface, this particle will go undetected. Undetected particles give spurious results when they appear in the record cards used in machines.

It is therefore the principal object of this invention to provide an improved device for detecting conducting particles in an insulating web in such a manner that variations in thickness of the web will not cause false operation of the device.

Other and further advantages will be obvious from a description of the accompanying drawings.

Figures 1, 2:
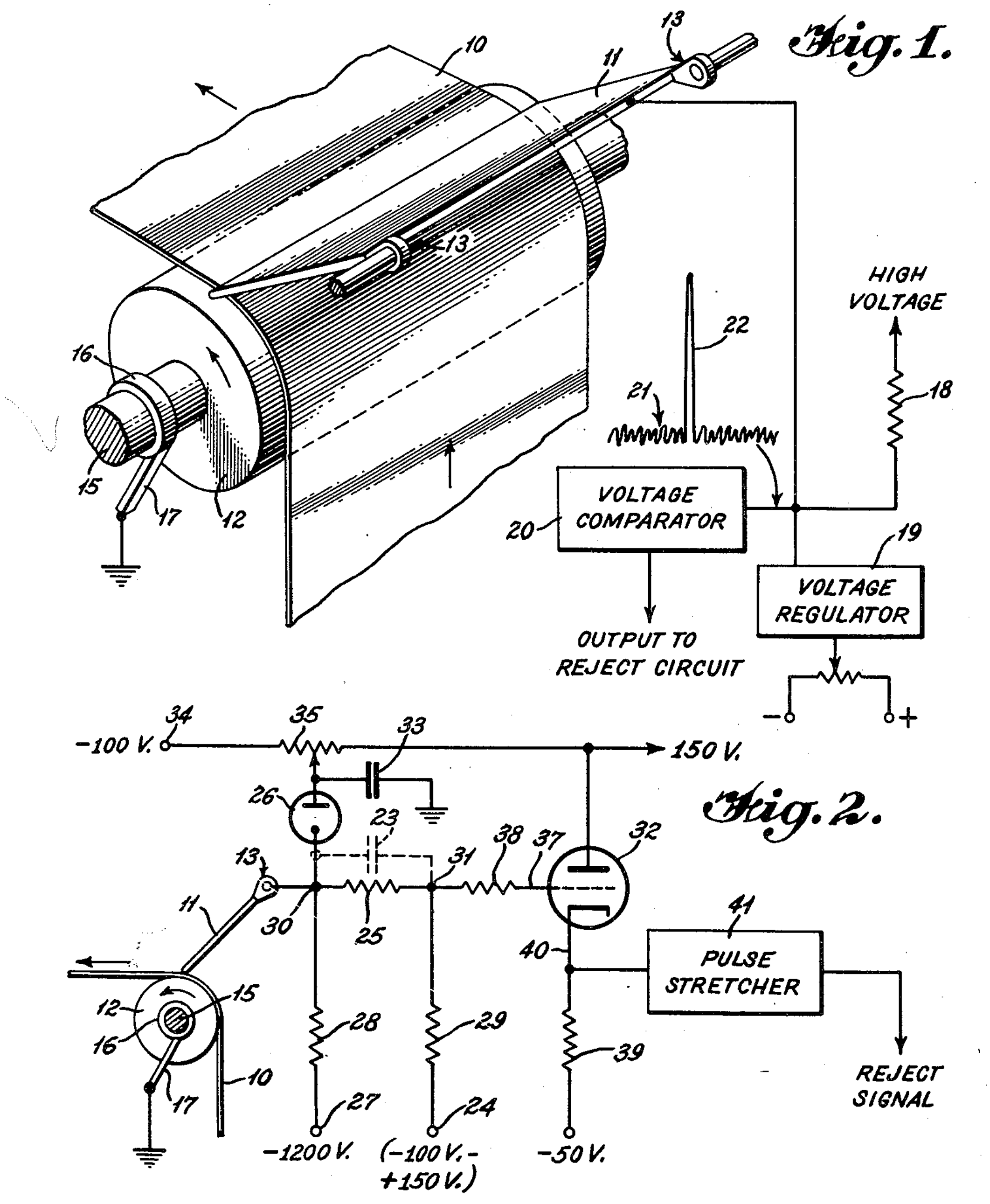
Figure 1 is a view partly in perspective and partly diagrammatic showing a detecting device constructed in accordance with the present invention.
Figure 2 is a view partly schematic and partly in the form of a circuit diagram showing an electrical circuit which may be used in accordance with the present invention. Particularly the circuit shown relates to D.C. coupling between the particle detector and the circuit for providing the reject signal, but also illustrates an alternate embodiment in which A.C. coupling may be used.

Referring first to Figure 1, the web 10 is being moved in the direction indicated by the arrows between a first electrically conducting surface or blade 11 and a second electrically conducting surface or roll 12. The blade and the roll span substantially the complete surface width of the web 10. The blade 11 is pivoted in any convenient manner, such as illustrated at 13, so that it rides on one surface of the web 10. It may be slightly biased toward the surface of the paper. The roll 12 is mounted on a shaft 14 which carries a commutator 16 against which is positioned a brush 17. The brush 17 may be grounded as shown. A high voltage source provides a voltage to the blade 11 through the resistor 18. Because of the variations in thickness of the paper the distance between the blade 11 and the roll 12 will vary. This variation in the distance between these elements, which act as plates of a condenser, coupled with the variation in thickness of the paper which acts as a dielectric between these plates, will result in rather large changes in capacitance. Under ordinary circumstances this would result in corresponding potential variations at the blade. This produces what is known as background noise. To cut down the background noise, a voltage regulator 19 is provided. This voltage regulator may take any convenient form such as a Zener diode or corona voltage regulator tube. It functions to maintain the voltage of the plate substantially constant until the plate swings toward ground due to the presence of a conductive particle. This eliminates substantially all of the background noise and provides a signal to the voltage comparator 20 in the form indicated by the numeral 21. The high amplitude swing of the signal at 22 indicates the presence of an electrically conductive particle between the blade 11 and the roll 12 in the web 10. The voltage comparator 20 establishes a reference voltage whereby an output signal is provided to the reject circuit whenever the signal from the blade 11 exceeds this reference voltage.

Referring to Figure 2, there is shown in solid lines (excluding the condenser 23 shown in dotted lines) a circuit for coupling D.C. variations in the voltage at blade 11 to the voltage comparator and pulse stretcher. Under these conditions a voltage of +150 volts is applied at terminal 24. A voltage of —1200 volts is applied at terminal 27. The cathode of tube 32 is biased at —50 volts since tube 32 is normally nonconducting. By virtue of the voltage divider including resistors 25, 28, and 29, a voltage in the order of about —25 volts appears at point 31 and on the grid of tube 32. A voltage of approximately —500 to —700 volts appears at point 30. The corona voltage regulator tube indicated at 26 shunts to ground through the condenser 33 substantially all of the background noise. This regulator establishes a substantially constant voltage at the blade 11 in the absence of a particle in web 10. It permits, however, the development of a voltage due to the presence of a particle between blade 11 and roll 12. —100 volts is applied at terminal 34. +150 volts is supplied to the plate of tube 32. The sensitivity control 35 is connected between —100 volts and +150 volts and provides a means of adjusting the voltage on the plate of 26 to thereby adjust the voltage at the blade 11. The voltage at blade 11 determines the voltage gradient between blade 11 and roll 12 and consequently determines the size of the particle in the web that will cause breakdown and thereby be detected. When a large positive swing appears at point 30 due to the presence of an electrically conducting particle between blade 11 and roll 12, the grid 37 through grid resistor 38 is driven positively to about +25 volts to make tube 32 conducting. The current through tube 32 and through the cathode resistor 39 causes a positive swing of the cathode 40. Tube 32 is biased so as to discriminate against the low amplitude swings due to the noise voltage that is not eliminated by the tube 26. The pulse stretcher 41 which receives the output from the cathode 40 of tube 32 provides a usable reject signal to the utilization circuit by stretching the signal input thereto to a substantial pulse width. Any type of stretcher may be used.

In the event that an A.C. coupled circuit is used, resistor 25 is replaced with condenser 23. Also terminal 24 is supplied with —100 volts D.C. Substantially the same action takes place. The variations of blade potential due to the presence of particles are coupled through condenser 23 to the grid 37 of tube 32. When the normal cut-off bias is overcome, a signal appears on cathode 40. This signal is fed to the stretcher 41.

Figure 3:
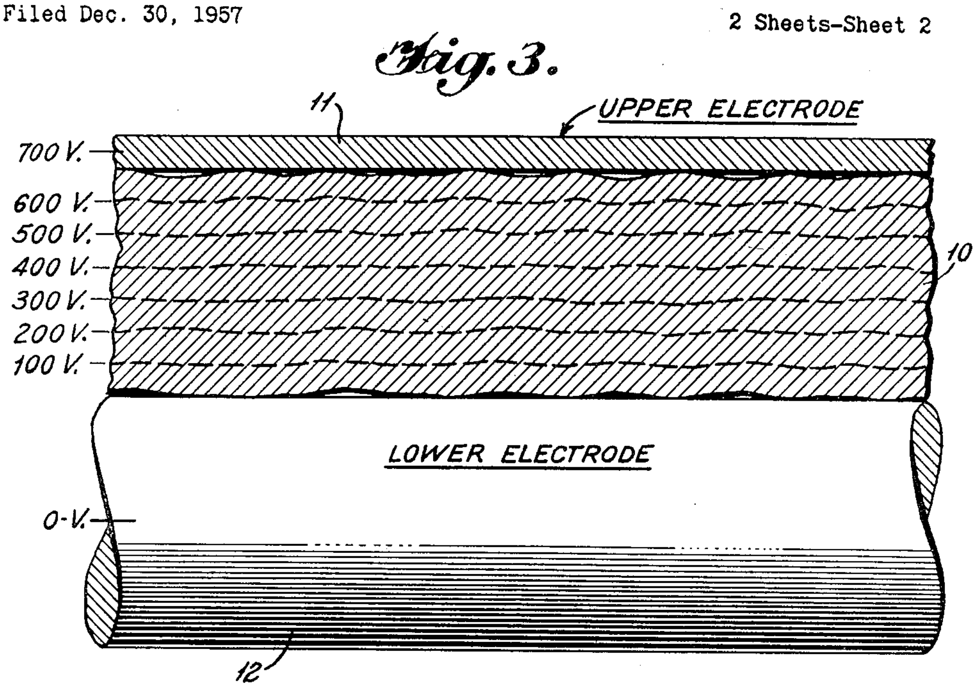
Figure 3 is a view showing a cross section of the web as it moves between the upper electrode and lower electrode constructed in accordance with this invention and particularly showing the voltage gradient between the electrodes.
Figure 4:
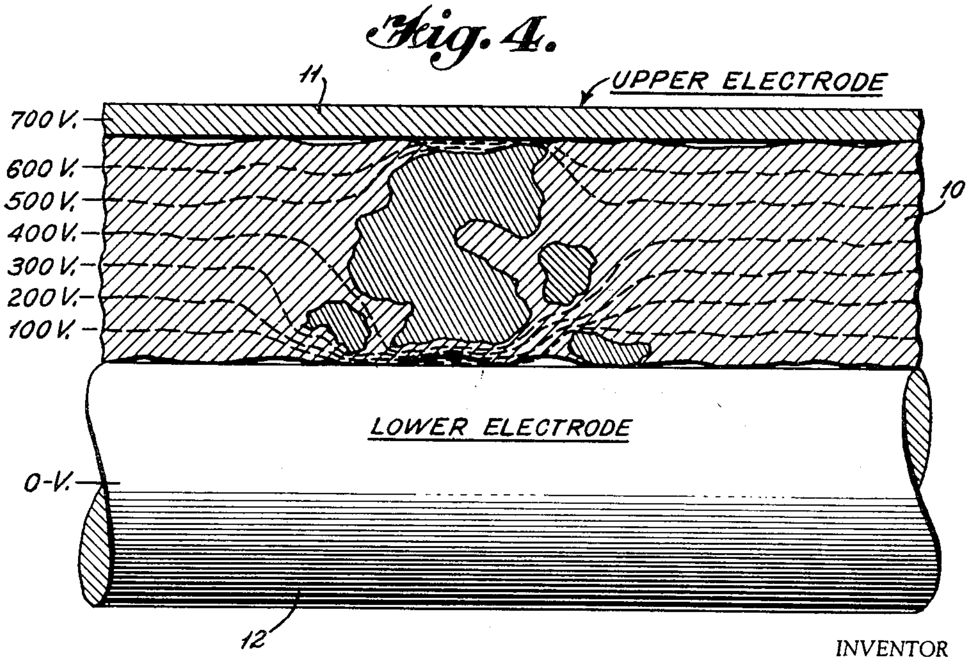
Figure 4 is a view similar to Figure 3 showing the effect on the voltage gradient of the presence in the web of an electrically conducting particle.

Referring to Figures 3 and 4, there is shown the voltage gradient existing between the upper electrode or blade 11 and lower electrode or roller 12 in the event of a 700-volt application to these electrodes. The dotted lines indicate points of equipotential between these electrodes and show the voltage gradient through the thickness of the web 10. In Figure 3 the voltage gradient is shown in the absence of any electrically conducting particle in the portion of the web between the electrodes. In Figure 4 the distortion of the voltage gradient is shown due to the presence of electrically conducting particles 42 between the electrodes. Due to the presence of the conductive particles between the electrodes, the electrostatic field is badly distorted inasmuch as all portions of a conductive particle carrying no current must be at the same potential. This distorted field causes a high potential gradient as indicated by the closeness of equipotential lines and this gradient exceeds the gradient which can be withstood by the web due to its dielectric strength and breakdown occurs. A minute current is actually passed between the electrodes and the potential of the blade 11 rises toward the potential of roll 12. This minute current is manifested by a voltage swing such as indicated at 22 in Figure 1. The voltage of the blade 11 is made adjustable by sensitivity control 35 over a gap-breakdown range of approximately 20 percent to 50 percent of operating thickness. Therefore, a conductive particle which occupies at least 50 percent to 80 percent of the electrode gap will give a reject signal. Blade potential adjustment as achieved by the sensitivity control 35 offers a simple means for controlling inspection sensitivity.

While there has been illustrated A.C. and D.C. coupling circuits using tubes, transistorized circuits can also be used.

What has been shown are embodiments of the present invention. Other embodiments obvious to those skilled in the art from the teachings herein are contemplated to be within the spirit and scope of the accompanying claim.

What is claimed is:

A device for detecting the presence of an electrically conducting particle in a moving web of insulating material comprising means to establish through a cross-sectional area of the web a voltage field normally having a uniform gradient between the web surfaces, said area spanning the entire width of said web, said means comprising a first electrode adapted to contact one surface of the moving web across the width thereof and a second electrode yieldingly engaging the other surface of the moving web across the width thereof, said voltage field being normally insufficient to produce a non-capacitive current through said web when a particle occupying a predetermined fraction of the distance between the web surfaces passes between said electrodes, a normally non-conducting electrical discharge device, circuit means connecting one of said electrodes to said discharge device so that said device is rendered conductive to produce an output pulse upon the occurrence of a large current pulse through said web material due to the presence of a conducting particle therein, and a normally conducting voltage regulating means connected to one of said electrodes and biased to provide a shunt path for smaller current pulses caused by normal variations in capacitance between said electrodes due to variations in the thickness of the web material passing between said electrodes, said regulating means being rendered non-conductive by said large current pulse to open said shunt path.

References Cited in the file of this patent

UNITED STATES PATENTS

| | | |
|---|---|---|
| 1,827,349 | Bing | Oct. 13, 1931 |
| 2,220,489 | Lowkrantz | Nov. 5, 1940 |
| 2,227,050 | White et al. | Dec. 31, 1940 |
| 2,653,298 | McKinley | Sept. 22, 1953 |
| 2,772,394 | Brodley | Nov. 27, 1956 |
| 2,803,701 | Clark et al. | Aug. 20, 1957 |
| 2,829,340 | Lippke | Apr. 1, 1958 |
| 2,873,425 | Huggins | Feb. 10, 1959 |